US008403179B1

(12) United States Patent
Gerber

(10) Patent No.: US 8,403,179 B1

(45) Date of Patent: Mar. 26, 2013

(54) AUTOMATIC DRAW VALVE FREEZER WITH MULTIPLE FLAVOR OPTION

(75) Inventor: Ernest C. Gerber, Danville, IN (US)

(73) Assignee: Flavor Burst Co., L.L.P., Danville, IN (US)

( * ) Notice: Subject to any disclaimer, the term of this patent is extended or adjusted under 35 U.S.C. 154(b) by 1381 days.

(21) Appl. No.: 12/102,093

(22) Filed: Apr. 14, 2008

(51) Int. Cl.

| | |
|---|---|
| ***B67D 7/74*** | (2010.01) |
| ***B67D 7/78*** | (2010.01) |
| ***B67D 3/00*** | (2006.01) |
| ***F25D 3/00*** | (2006.01) |
| ***F16K 31/00*** | (2006.01) |

(52) U.S. Cl. .................. 222/129.4; 222/145.6; 222/504; 222/129.1; 62/389; 251/63; 251/129.04

(58) Field of Classification Search ............... 222/145.6, 222/129, 129.1, 129.2, 129.3, 129.4, 145.5, 222/504, 146.6; 62/389, 390; 137/30.01, 137/63.6, 62, 129.04; 251/30.01, 63.6, 62, 251/129.04

See application file for complete search history.

(56) References Cited

U.S. PATENT DOCUMENTS

| | | | | |
|---|---|---|---|---|
| 2,566,436 | A * | 9/1951 | Waite | 99/323.2 |
| 3,744,764 | A * | 7/1973 | Sedam | 366/250 |
| 4,201,558 | A | 5/1980 | Scwitters et al. | |
| 4,203,461 | A | 5/1980 | Schwitters | |
| 4,793,520 | A | 12/1988 | Gerber | |
| 6,689,410 | B2 * | 2/2004 | Gerber | 426/565 |
| 7,059,761 | B2 | 6/2006 | Gerber | |
| 2001/0011660 | A1 * | 8/2001 | Schroeder et al. | 222/129.1 |
| 2008/0073376 | A1 | 3/2008 | Gist | |

FOREIGN PATENT DOCUMENTS

WO WO2007070031 * 6/2007

* cited by examiner

*Primary Examiner* — Kevin P Shaver
*Assistant Examiner* — Stephanie E Williams
(74) *Attorney, Agent, or Firm* — Woodard, Emhardt, Moriarty, McNett & Henry LLP

(57) ABSTRACT

A conventional frozen carbonated beverage freezer is modified to eliminate the draw handle to facilitate better performance at the hands of an untrained customer in a serve yourself setting. A conventional FCB freezer, with or without a draw handle, is modified to enable dispensing different flavors of frozen carbonated beverages by a customer for a self-serve setting.

19 Claims, 8 Drawing Sheets

AUTOMATIC DRAW VALVE FREEZER WITH MULTIPLE FLAVOR OPTION

BACKGROUND

In the food and beverage industry, there are many business establishments serving retail customers. In some establishments, such as convenience stores, fast food restaurants, and cafeterias in grocery stores, for example, there are dispensers for various beverages. One type of dispenser is a frozen carbonated beverage (FCB) freezer which a customer can use to dispense a frozen carbonated drink in the consistency of a slush. Frozen products sold under the name and federally registered brands Coca-Cola®, Pepsi®, and Sprite®, are common examples. It is typical that a separate dispensing freezer is provided for each of the different brands to be dispensed.

It is common that such dispensers have a draw handle pivotally mounted at the front of the machine for the customer to use after placing a receiver cup under the spout. The customer pulls the handle and dispenses the frozen drink. Many customers are not particularly skillful in pulling the handle in the way that will provide a reasonably full cup, without overflowing.

To address this problem, some newer types of dispensing freezers take away from the customer the opportunity to use a draw handle, by providing a "start" button. After putting a cup in place to receive the drink, the dispensing valve is opened by pressing the "start" button. The dispensing of the product is automatically controlled at a point determined by (1) internal timer (based on cup size), or (2) pyro-sensor cup holder that would cease dispensing when the sensor detects the cup is full (regardless of the cup size), or (3) "stop" button switch which would cease dispensing product any time the switch is pressed.

In my view, to require the owner of an FCB freezer which has a draw handle, to buy a new FCB freezer with a push button, just to overcome this problem with customers using draw handles, is not an attractive option.

Another concern in the business of providing frozen carbonated beverages in self-serve venues, is providing the brands and flavors of drinks that will be favored by the most customers. This has required a number of freezer machines corresponding to the number of different flavors needed. This involves not only the expense of purchasing or leasing of such equipment, but also the operating expense, corresponding to the number of freezers needed. The present invention solves these problems.

A BRIEF DESCRIPTION OF THE DRAWINGS

DESCRIPTION OF THE ILLUSTRATED EMBODIMENTS

Figure 1:
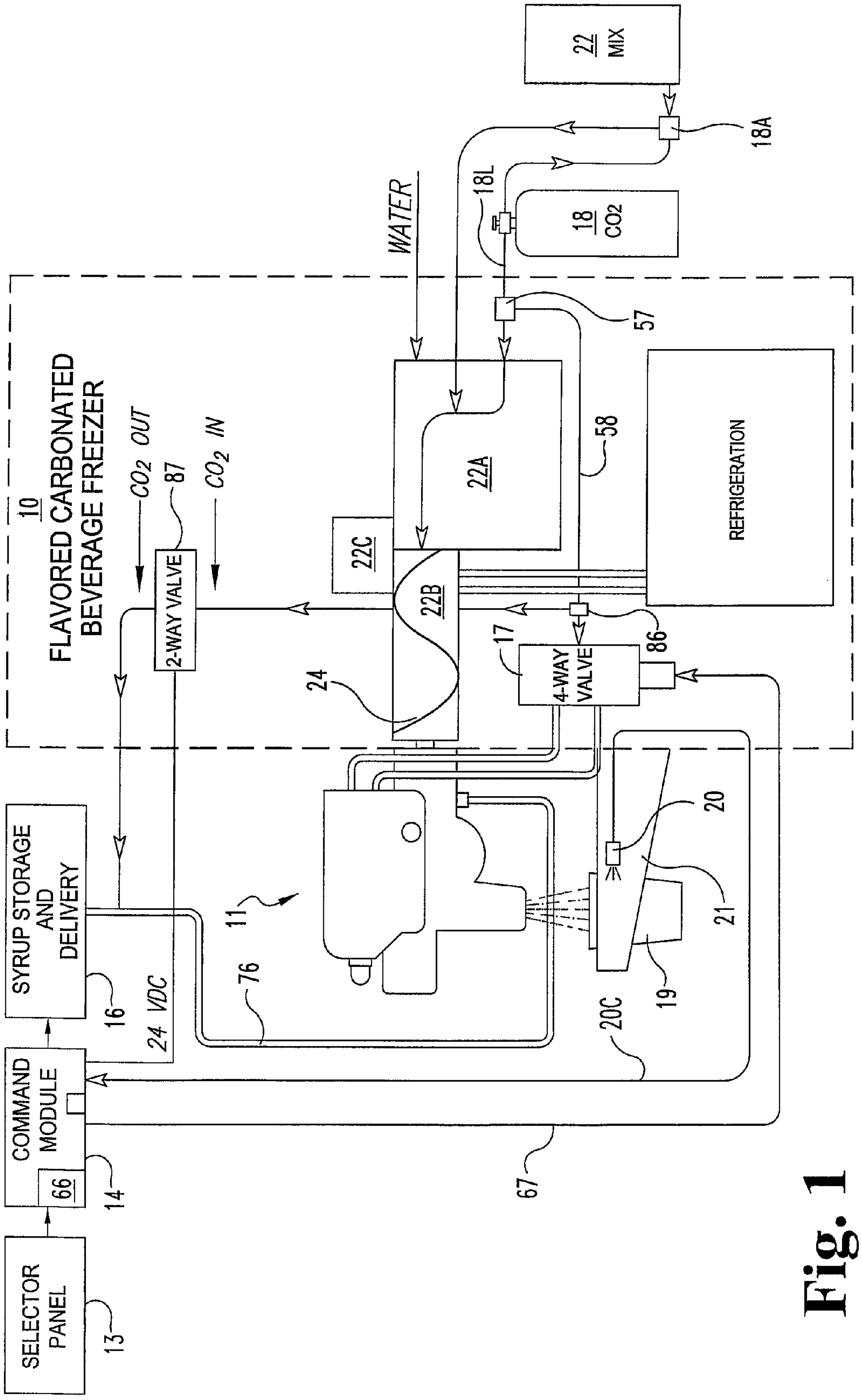
FIG. 1 is a diagram showing schematically a system incorporating aspects of an embodiment of the present invention.

Referring now to the schematic FIG. 1, a frozen carbonated beverage (FCB) freezer 10 shown in dashed lines has a dispenser head 11 and a control keypad 13 mounted on the front of the freezer. The keypad is electrically connected to a command module 14 in cabinet 15 containing electrical controls including a microprocessor and miscellaneous electronic devices for controlling an ingredient storage and delivery module 16 also in the cabinet and a four-way valve 17 newly installed in the freezer. A source 18 (a rental tank, for example) of pressurized carbon dioxide, and a container 22 (such as a boxed bag, for one example) of a flavored beverage in liquid form to be carbonated, frozen to slush and dispensed, are associated with the freezer. In an example to be described later herein, a neutral base is used in lieu of a bagged flavored beverage. A cup 19 for reception of the frozen beverage from the head 11, is received by a cup holder 21 on the front of the freezer and equipped with a pyro-sensor 20.

Figure 2:
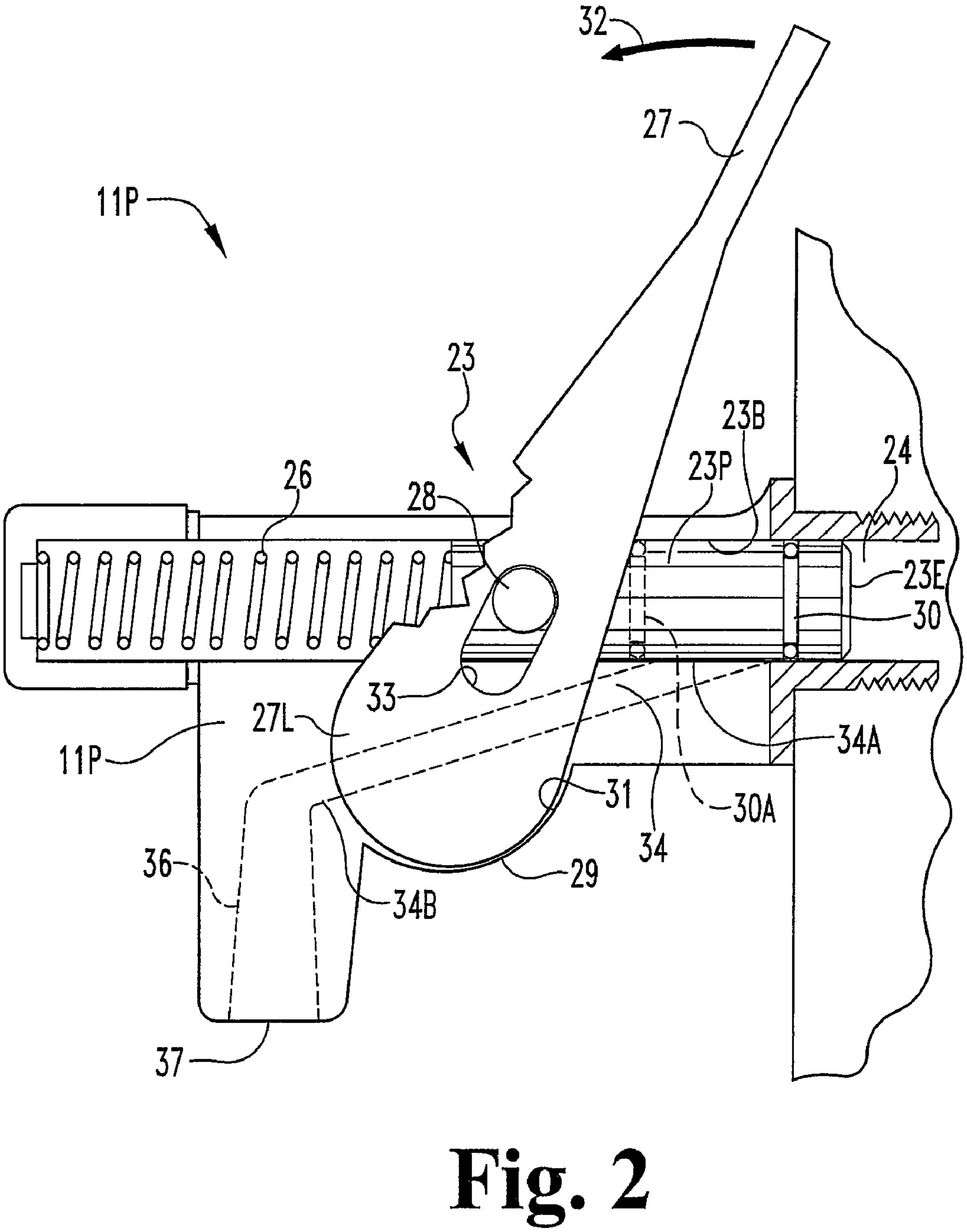
Fig. 2 (Prior Art)
FIG. 2 is an enlarged drawing of a prior art dispensing head before modification according to an aspect of the present invention.

Referring now to FIG. 2, a prior art dispenser head 11P has a valve body containing a beverage dispensing draw valve 23 which includes a cylindrical hole 23A providing a bore 23B for receiving piston 23P. One end 23E of the piston faces the freezer outlet port 24. A pump 18A, powered by CO2 pressure from tank 18, pumps a flavored beverage from container 22 through a carbonator 22A and into cylinder 22B ("the freezer barrel") in which there is a mixing auger. As the auger inside the cylinder rotates, it scrapes the frozen crystals from the surface of the cylinder walls. The crystals continue to accumulate inside the cylinder until the product reaches the desired consistency of slush, based upon a pre-set torque level for the auger. The refrigeration process of the freezer refrigeration equipment alternates on and off whenever the torque level fluctuates -ON when the torque falls below the desired level and -OFF when the torque level is above the desired level. Then the slush can exit through the port 24 when the draw valve is opened. A return spring 26 in the valve bore holds the piston in the valve closed position shown in FIG. 2.

A draw handle 27 has a yoke portion with two spaced legs 27L connected by a pin 28 through the piston 23P. The pin extends transverse to the piston axis and out through longitudinally extending slots in the sides of the head 11 and into slots 33 in the handle legs. The curved lower ends of the handle legs at 29 are received in cradles 31 in the sides of the head. Therefore, as the handle is pulled in the direction of arrow 32, the combination of the pin in the slots 33 and the cradles 29 on the head enable the handle to pivot in the cradles and pull the valve piston open to the position where the O-ring seal is shown by dashed lines 30A in FIG. 3.

A passageway 34 in the head has an upper end which intersects and thereby opens at 34A into the valve bore 23B. As the draw handle 27 is pulled in the direction of arrow 32, and pulls the piston 23P in the same direction to the extent that the O-ring seal 30 on the valve piston 23P passes the edge of the opening 34A, the soft frozen or shaved-ice beverage under pressure in the freezer barrel 22B flows from the barrel through the port 24 and enters the passageway 34. The passageway 34 slopes downward from port 34A to a transition region 34B where the sloping passageway 34 turns into a downward and outward flaring passageway 36 to spout outlet 37 for discharge of the beverage into a cup. When the user has completed drawing the beverage from the spout by releasing the draw handle, the return spring 26 will close the valve and terminate the discharge of frozen beverage from the spout.

Figure 3:
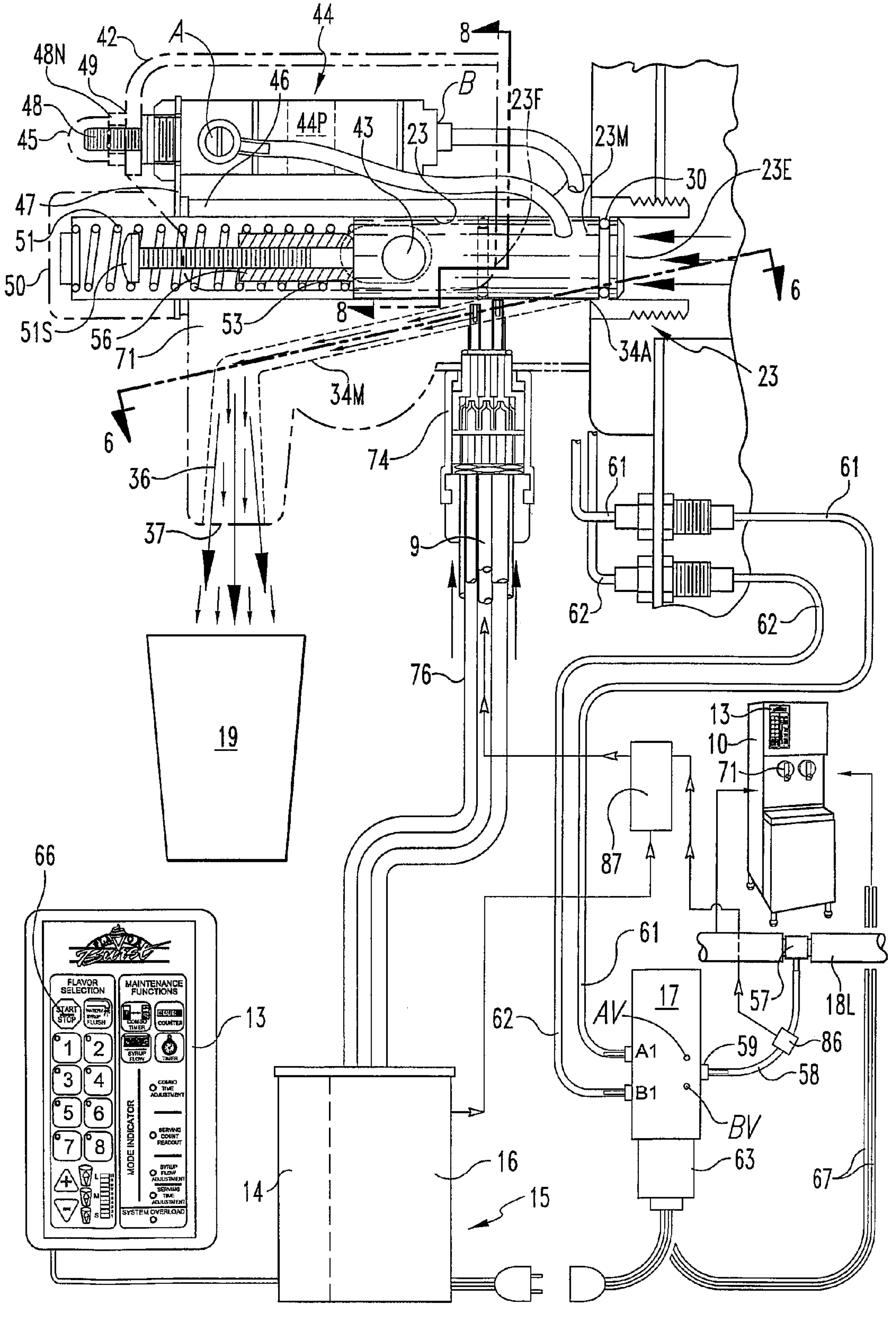
FIG. 3 is an illustration of the system of FIG. 1 but with certain components shown in more detail than in FIG. 1.

Referring now to FIG. 3, showing modifications and additions incorporating inventive concepts, the draw valve piston is much the same as in FIG. 2 but has a feature added to one end, so is given the reference numeral 23M indicating a modification. The valve is closed as it is in FIG. 2 but there is no draw handle. With the handle gone, a shroud 42 is mounted over the top of the head and is pinned to the valve by a pin 43 passing through the same hole in the valve piston 23M as did the pin 28 used for the draw handle shaft in FIG. 2. The pin 43 can be the same as pin 28, but it is received through holes (not slots) in both sides of the shroud. An actuator in the form of draw valve shuttle cylinder 44 is mounted atop the valve body 46, and is fastened by a bracket 47 attached to the end of the cylinder 44 and to the end of the valve body portion of the head. This cylinder is double acting, having a port A and a port B. The drive piston 44P inside the cylinder 44 has a piston rod 48 extending through a hole 49 at the closed end of the shroud 42 and secured to the shroud by a threaded nut 48N, which can be a nut with a closed end as indicated at 45.

A valve body end cap 50 is screwed into the valve body closing the outer end of the draw valve cylinder bore 23B. A return spring 51 has one end seated in cap 50 and the other end bearing on end 53 of the valve piston 23M. The spring urges the piston 23M in the direction toward the closed condition shown in FIG. 3. The draw valve piston 23M in FIG. 3 is like that in FIG. 2 except that there is a stem 56 welded or otherwise fixed to the piston end 53 remote from the freezer. The stem is internally threaded to receive a valve travel adjustment screw 51S. The stem 56 can serve both as a spring guide and as a nut on the screw 51S. Whenever pressure is applied to port B and vented from port A of the shuttle cylinder 44, driving the shroud and thereby the piston 23M outward toward the cap 50, the screw head 51S can engage the inside end face of the cap 50 to limit the travel of the piston 23M in the outward direction. The cap 50 is removable for screwdriver access through the spring 51 to the slot in the screw head to adjust the distance of travel of the piston 23M. To close the valve, port B is vented and gas pressure is applied to port A. Spring 51 assists the closing function.

Referring further to FIGS. 1 and 3, power for operation of the cylinder 44 is provided by carbon dioxide ($CO_2$) under pressure from tank 18. Pressurized $CO_2$ is usually available in FCB freezers for pressurizing the flavored beverage from the container 22 through the freezer barrel 22B into the valve body when the draw valve is open. It is also used for carbonation. Implementing the illustrated embodiment of the invention, the $CO_2$ is the gas used to power the shuttle cylinder 44. It is done by tapping with a Tee fitting 57 into a $CO_2$ line 18L anywhere in the freezer. The tap line 58 from fitting 57 is connected to an input port 59 of the four-way valve 17 installed to implement this invention. This valve has the ports A1 and B1 from which lines 61 and 62 are connected through the front panel of the freezer to the ports A and B, respectively of cylinder 44. There are also vent or exhaust ports AV and BV on the valve 17. The valve 17 is operated by solenoid 63. The solenoid, the four-way valve and the gas piping to cylinder 44, are arranged to keep the draw valve normally closed.

As indicated in the drawing, and mentioned above, when pressure is applied from the carbon dioxide supply port 59 into the valve 17 and through the valve to port A1, the pressure applied to port A in cylinder 44 will drive the draw valve to the open position shown by a dashed line at the front end 23F in drawing FIG. 3. At this time the B1 port is venting through the valve to the BV port to atmosphere. Similarly, if the draw valve is to be closed, the valve 17 is shifted by the solenoid to provide gas pressure supply from the port 59 to the port B1 in valve 17, and the pressure from the A port of the cylinder 44 is vented through the pipe 61 and the valve 17 to the AV port.

Figure 4:
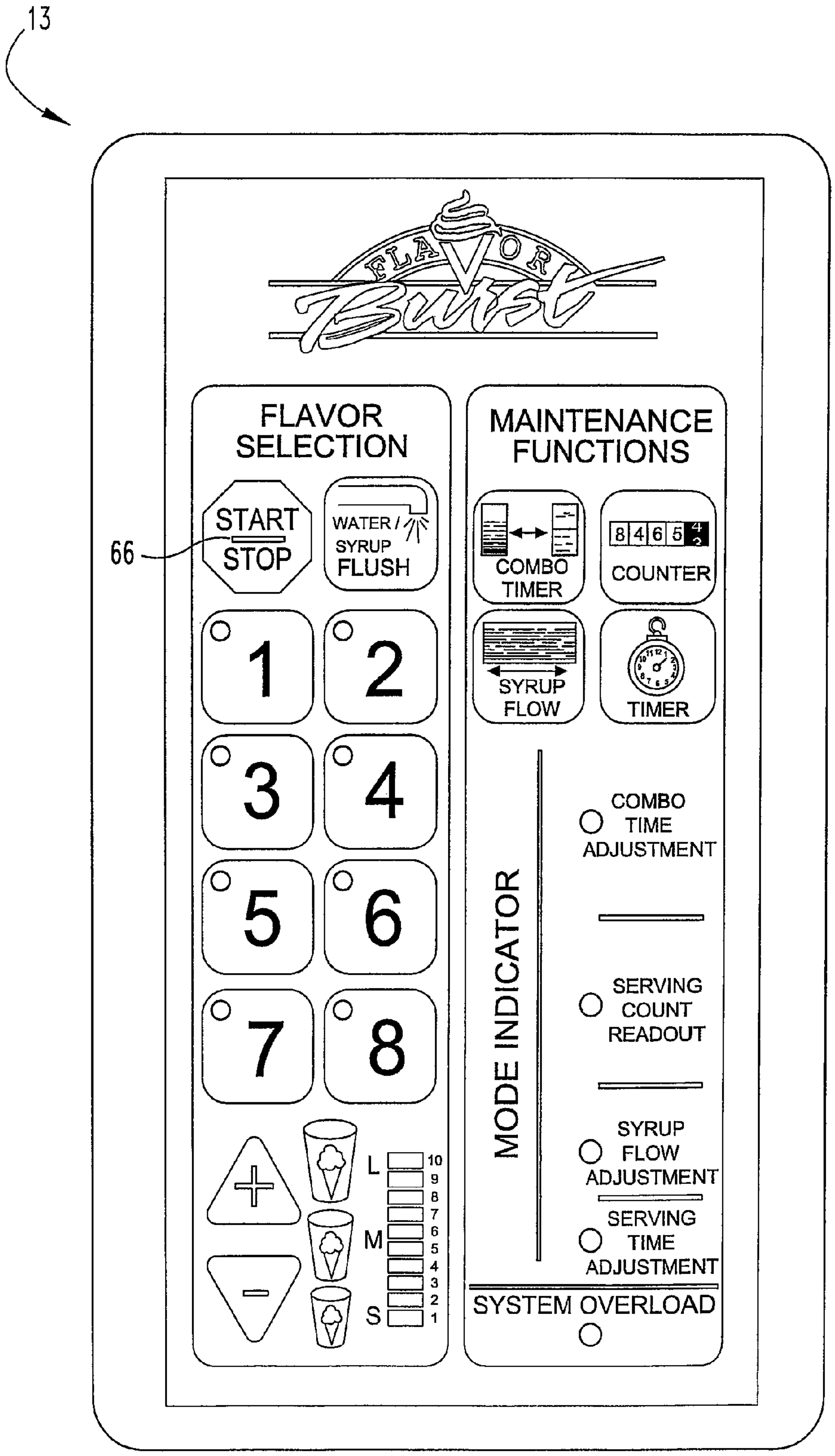
FIG. 4 is an enlarged face view of the control panel.
Figure 5:
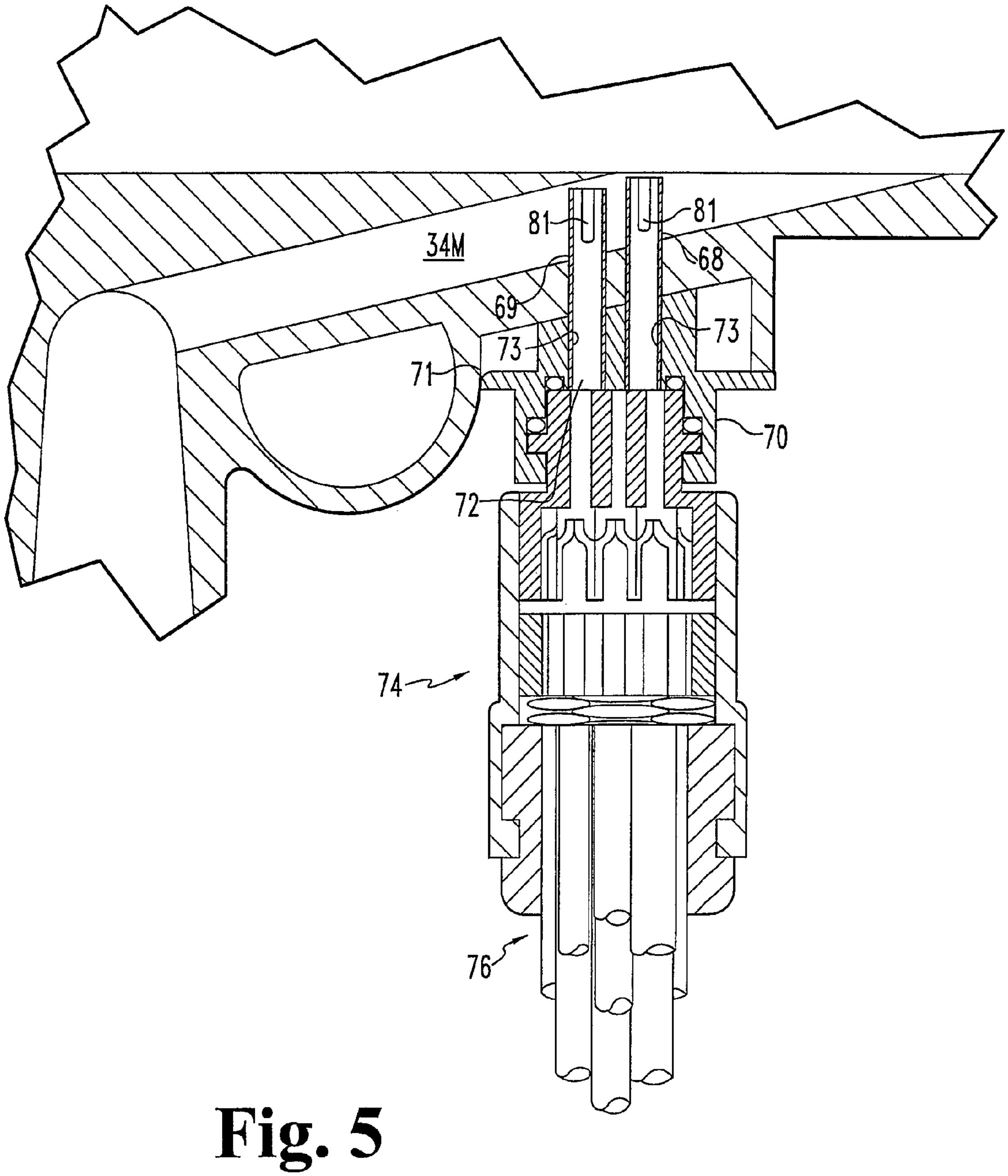
FIG. 5 is an enlarged sectional view of a double syrup injection port.
Figure 9:
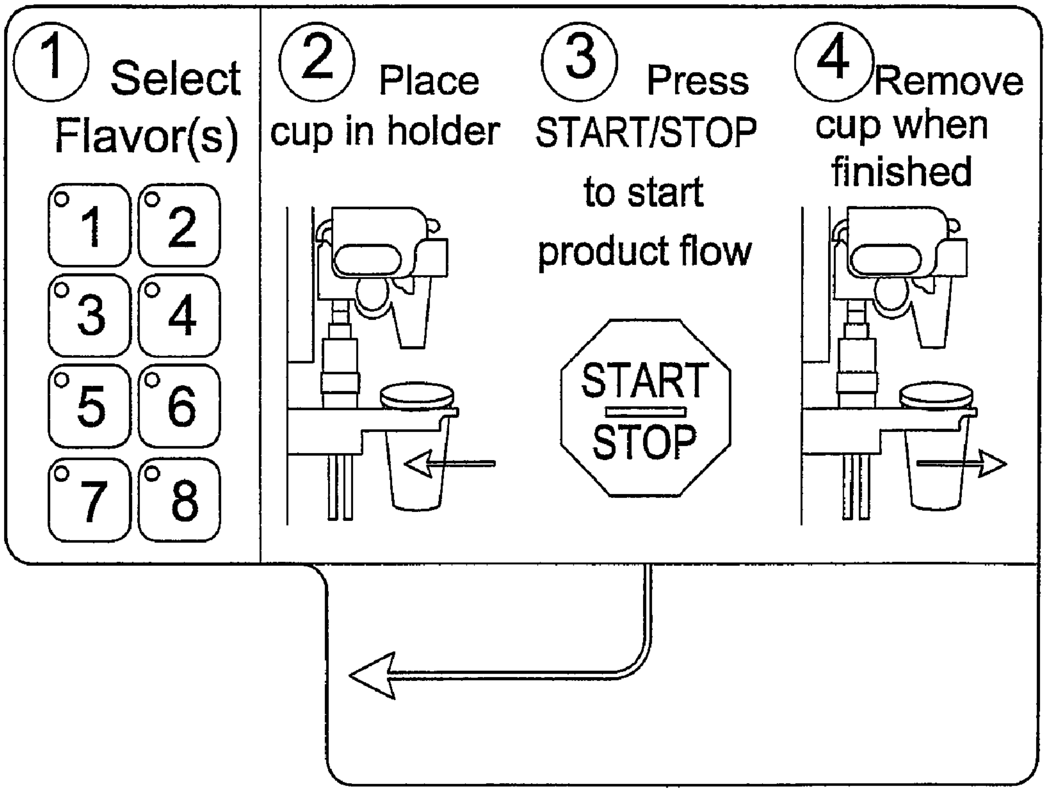
FIG. 9 shows a keypad cover for customer instructions on an FCB freezer system having an automatic cup-fill limit control.
Figure 10:
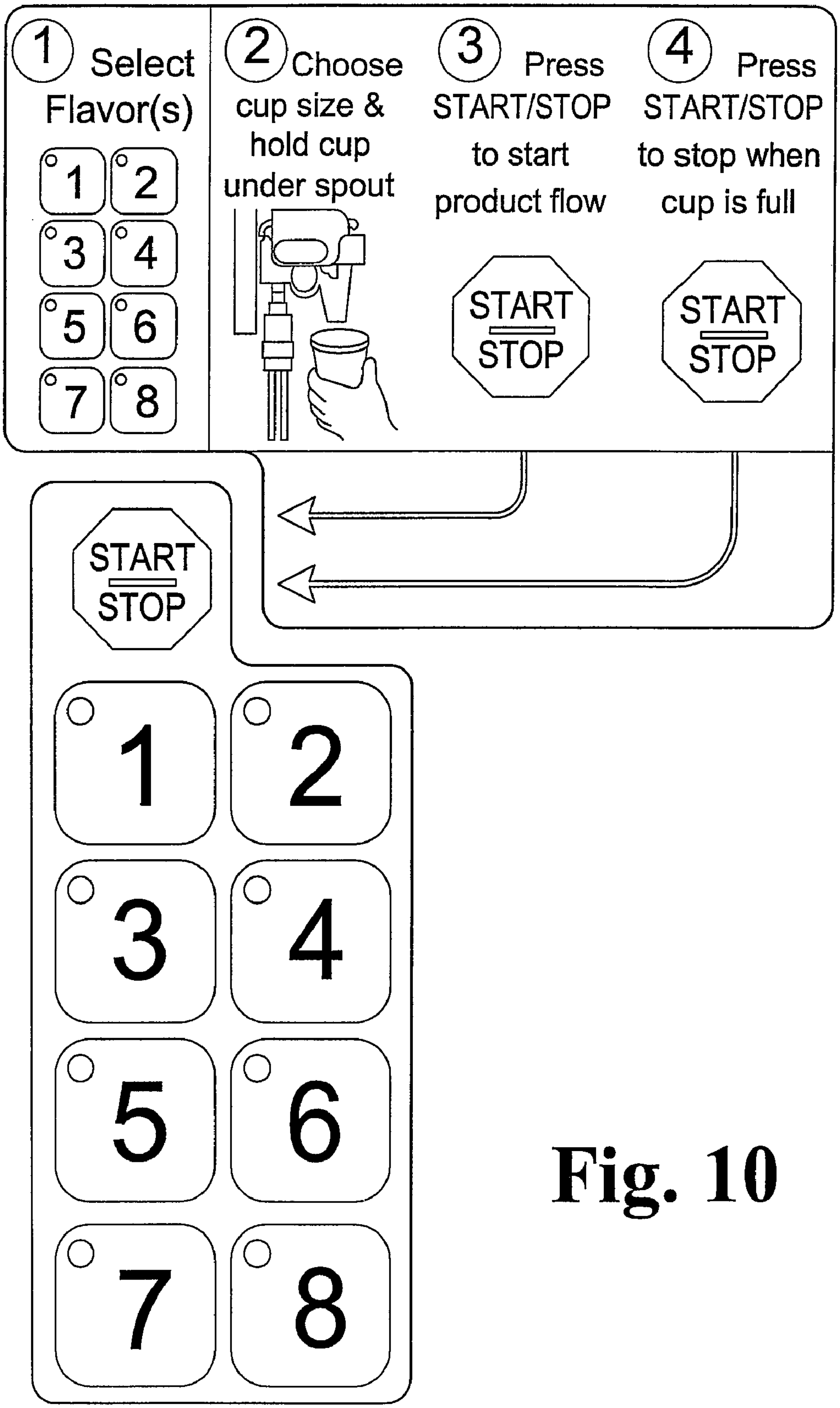
FIG. 10 shows a keypad cover for customer instruction on an FCB freezer system on which the customer needs to stop the dispensing of beverage.

Referring now to FIG. 4, a control keypad is shown with various legends, most of which will be described below. It supplies to a freezer from which draw handle 27 of FIG. 2 has been eliminated according to the inventive procedure described above. It was mentioned above that there are several ways that the dispensing of a beverage with a pre-flavored base such as a cola base from such a freezer can be turned off by an internal timer or a pyro-sensor or by pushing a stop button. We have not yet discussed details about an inventive freezer modification described later herein which uses a neutral, unflavored base and adds flavor according to a customer selection of one or more flavors. Therefore, for the present brief discussion of the keypad of FIG. 4, it should be mentioned that for customer use on a freezer that does not have the multiple flavor selection feature, a keypad cover such as shown in FIG. 9 or FIG. 10 would be secured over a large area of the FIG. 4 keypad. Also the cover would not include the flavor selection legends or buttons shown in FIG. 9 or 10. In short, the cover would have only the stop/start button or an arrow directing the customer to its location at 66 on the otherwise covered keypad 13. And the cover would have the three instructions shown in FIG. 9 or FIG. 10. For a machine which has an automatic stop feature, such as by an internal timer based upon cup size, or a pyro-sensor cup holder or some other automatic stop feature, the instructions would be as shown in FIG. 9. For a machine without the automatic stop feature, the instructions would be as in FIG. 10. On the freezer without the multi-flavor selection feature, the other FIG. 4 buttons and legends that are hidden are for use of the freezer owner or operator, not the customer. Therefore, with either freezer model having the manual stop, or the one having the automatic stop feature, and without a draw handle such as 27, the draw of the beverage from the container 22 through the freezer barrel 22B can be initiated by simply pushing the start/stop button. Through the command module 14 (FIG. 1) this step will activate the four-way valve solenoid 63 to connect the carbon dioxide supply from line 58 through input port 59 of valve 17 and output port B1 of valve 17 and to port B of cylinder 44 to open the draw valve. It can simultaneously activate a draw device 22C (a motorized rotor or auger or piston, for example) but more likely simply rely on the normally pressurized frozen beverage (slush) in the freezer barrel 22B to move the slush through freezer port 24 (FIG. 2) into the dispenser head. So the slush flows through the upper end opening 34A of passageway 34 into and through the passageway 34 down to and through the spout outlet 37. Then, in the automatic shut-off version (FIG. 9 keypad cover) with an appropriate sensor of some kind such as an internal timer or a pyro-sensor 20, for example, or the start/stop button, the 4-way valve 17 is shifted to vent port BV and pressurize port A1 of the valve 17, causing the valve piston 23P to close. With the manual shut-off version (FIG. 10 keypad cover), the customer will terminate the dispensing by pushing the start/stop button. In either of the FIG. 9 or 10 versions, the customer can stop the dispensing at any time by pushing the start/stop button. Therefore, the above-mentioned shortcomings of freezers equipped with draw handles, can be eliminated by the inventive combinations of modifications and additions described above. The customer need only push a switch or touch a pad to start dispensing the beverage. The finish can be automatic by use of an internal timer or pyro-sensor cup or other automatic means as mentioned above or, if necessary or desired, by pushing the start/stop button. Thus far, the flavor selection option as suggested by the full keypad of FIG. 4 and the keypad covers of FIGS. 9 and 10, has not been described here, but only briefly mentioned.

The above-described embodiment shown in FIGS. 1 and 3 enables convenient and inexpensive conversion of a conventional FCB freezer having a draw valve handle, to a user-friendly model enabling a user to push a button and automatically draw a flavored beverage from the freezer without doing anything more than simply pressing the start button.

Modification Procedure

Draw Handle-to-Button Conversion

The following procedure and equipment are used to convert an FCB freezer which has a dispenser head such as the prior art example of FIG. 2, and which has a manually operated draw handle, into an automatic draw valve without a handle:

1. Remove the draw handle mounting pin 43 from the dispenser head, and remove the handle.
2. Install suitable mounting brackets such as 47 on the dispenser head and connect the piston rod end of the gas-operated cylinder 44 to the bracket.
3. Connect the gas lines 61 and 62 to the ports A and B, respectively on the cylinder 44.
4. Install four-way valve 17 in the freezer.
5. Attach the gas lines 61 and 62 to the ports A1 and B1, respectively, of valve 17.
6. Cut the carbon dioxide line 18L from tank 18 and install the Tee 57 in the line 18L and extend the line 58 from the Tee 57 to the port 59 in the four-way valve 17.
7. Connect the lead wires 67 from the solenoid 63 of the valve 17 to the draw device 22C in the freezer.
8. Using the draw handle pin 43, place the cylinder shroud 42 over the cylinder 44 and the end of the piston rod shaft 48 through a hole in the closed end of the shroud. Connect the shroud to the cylinder piston with the pin through the shroud walls and through the piston. Install the cap nut 48N on the shaft 48 to fix the shroud onto the shaft.
9. Install the draw handle pin 43 through one sidewall opening of the shroud and on through the valve piston and out through the other shroud sidewall opening.
10. Secure the pin assembly to the shroud with a suitable screw.
11. Remove the cylinder end cap 50 from the head, exposing the return spring and the adjustment screw 51S which is threaded into the threaded stem 56 secured to the outer end of the piston by welding or otherwise.

As shown, the screw head 51S faces the inside wall of the draw valve cylinder cap 50. The distance that the screw is threaded into the receiver 56 will determine how far the draw valve piston 23M can move in the valve-opening direction. To reduce the dispensing flow rate, the flow rate adjusting screw 51S would be turned counter-clockwise, decreasing the stroke of the draw valve, as the motion in that direction would be stopped by the engagement of the screw head with the cap 50. To increase the flow rate, the screw would be turned clockwise, increasing the stroke of the draw valve piston.

The foregoing modifications enable a conventional FCB freezer to enable the customer to dispense a carbonated beverage of the right consistency by simply pushing the start button on the keypad and without depending upon the customer's skillfulness in using a draw handle.

Draw Handle or Touch Pad-Controlled FCB Freezer with Flavor Option

As mentioned above in the background, there is also a need for saving space and expense in providing a variety of flavors of frozen carbonated beverages without the additional space and expense required by as many additional freezers as needed for the additional flavors desired.

Another aspect of the present invention makes it possible that either a conventional FCB freezer using a handle-operated draw valve, or an FCB freezer using keypad operation of a draw valve according to the above-described aspect of the present invention, can be modified to use instead of a soft drink base, for example, an unflavored base with ingredients and stabilizers, and operate to enable a customer to select, and dispense by using the draw handle, or keypad, a carbonated beverage of any of eight or more possible flavors. To do so, and referring again to FIGS. 3 and 5-7, a downwardly-opening cavity 70 is formed by drilling or installing a fitting in the bottom of the valve body portion 71 of the dispenser head. The cavity is provided with bayonet-type socket features to receive a manifold plug 74 installed in the cavity 70. The plug consolidates a pack or harness 76 of nine tubes to enable entry of a flavoring fluid (usually a syrup) from any one of eight of the tubes from the ingredient storage and delivery module 16. The ninth tube 9, is for gas or water injection, to be explained below. The delivery module 16 and the distributor plug 74 are of a type disclosed in my U.S. Pat. No. 7,059,761 issued Jun. 13, 2006, the content of which is incorporated herein by reference, to any extent needed. So the selector panel of FIG. 4 and legends herein, bear some similarities to those in the panels in that patent. The plug 74 consolidates the nine tubes in sort of a manifold, for receiving syrup of a selected flavor or flavors pumped from module 16 and, discharging the syrups into the chamber 72 provided by the upper end of the plug 74 and the top of the cavity. Two holes 73 are provided (drilled, for example) from the top of cavity 70 up to the passageway 34M. Tubes 68 and 69 are pressed into the holes and extend up from chamber 72 into the passageway 34M. While the bottom access for adding the flavor option feature is convenient, side access locations may be used in the illustrated dispersing head. Other access locations may be used in this or other styles of dispensing heads.

Figure 6:
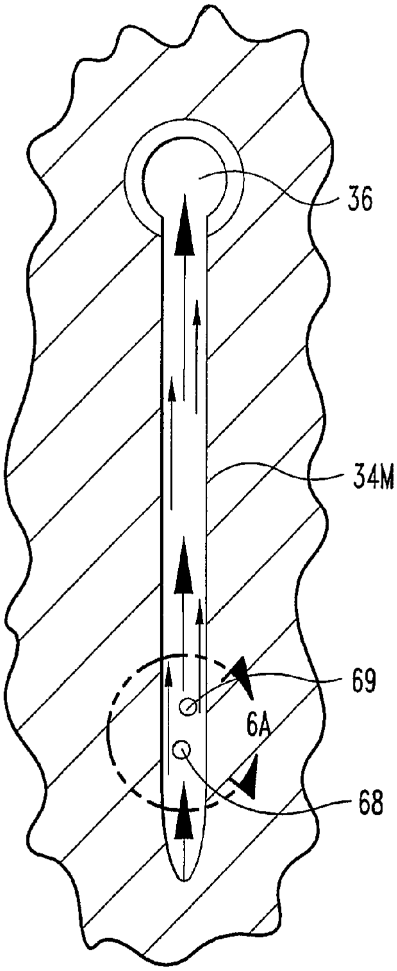
FIG. 6 is a sectional view of a blending chamber taken on a plane 6-6 in FIG. 3 and viewed downward.
Figure 6A:
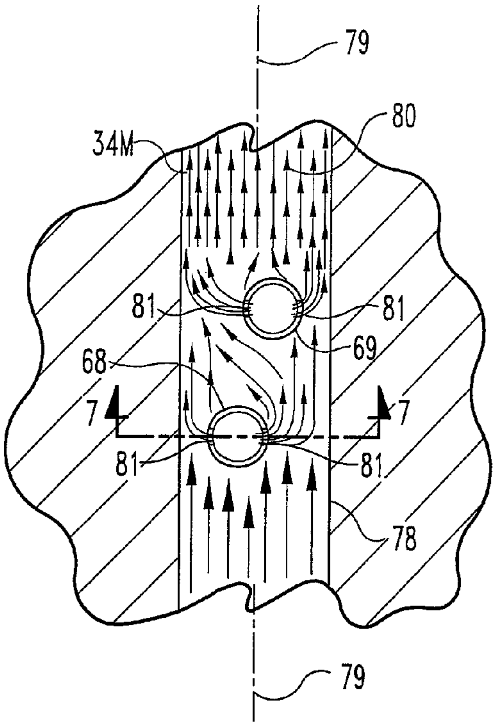
FIG. 6A is a fragment of an upper portion of the blending chamber of FIG. 6 but enlarged to show some details.
Figure 7:
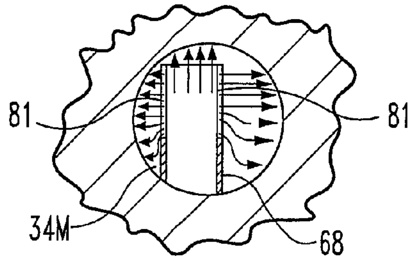
FIG. 7 is a cross-sectional view taken at line 7-7 in FIG. 6 and viewed in the direction of the arrows.
Figure 8:
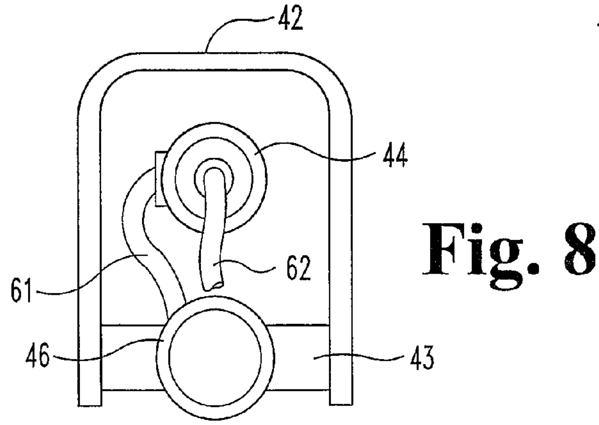
FIG. 8 is a view looking in the direction of arrows at plane 8-8 in FIG. 3, into the open end of a shroud covering a draw valve and valve shifting cylinder.

Now referring to FIGS. 2, 3, 6 and 7, the passageway 34 serves as a blending chamber in the prior art dispensing head, and in the head modified for the present invention, so is referenced 34M. FIG. 6 is a longitudinal sectional view of the blending chamber 34M as viewed from above along a sloping plane 6-6 in FIG. 3 and viewed in the direction of the arrows. The two tubes 68 and 69 have upper ends which are open and open into the blending chamber 34M just below where the blending chamber 34M intercepts the bore 23B of the draw valve. FIG. 6 shows the exit end of each of the tubes 68 and 69 where they reach the bore 23B. It will be noted that one of these tubes is a bit offset to one side of the center line 79 of the blending chamber, and the other of these tubes is offset to the other side of the center line. Also, as shown in FIGS. 6 and 7, there is a slot 81 in both sides of each of these tubes and extending down from the open top of the tube part-way toward to the bottom of the tube. Each of the tubes has an open top. The flow-indicating arrows in FIGS. 6 and 7 show resulting distribution in the blending chamber of the flavoring syrup which has been pumped from the delivery unit 16 through one of the lines in the pack 76 and up from the chamber 72 and out from the slots 81 and upper ends of the tubes 68 and 69 into the flow of a neutral frozen base product delivered from the freezer barrel in slush condition when the draw valve is open. This provides direct blending of the flavoring syrup all the way across and down the blending chamber 34M. With the base material coming from the freezer through the freezer barrel, and having already been carbonated by the freezer itself, a frozen carbonated beverage, flavored at the choice of the user, passes through the exit port 38 into the receiver cup 19.

By opening the draw valve 23, whether it would be by the draw handle in a conventional FCB freezer, or by the gas cylinder 44 in the above-described FCB freezer modified for touch pad or button operation, the neutral base from the container 22 begins to flow into the passageway 34M immediately and is exposed to the selected syrup or syrups flowing up from one of the tubes in the group 76 mounted in the plug 74, into the chamber 72 and from there up the tubes 68 and 69 and injects the flavoring syrup/s as indicated by the small and curved arrows in FIGS. 6 and 7 into the neutral base material flowing into the passageway 34 and distributing the syrup into the neutral base entirely around the interior of the passageway, and provides a thorough blending in the blending chamber passageway 34. Then, as the blended product enters the expansion chamber 35, it expands for delivery downward from the outlet 38 into the receiving cup 19. It may be noted here that, if more than one flavor of syrup is selected for a single serving, it is preferable that the syrup pumps as disclosed in the above-mentioned patent, alternate when drawing a multi-flavored serving.

Use of the slotted injection tube ends to inject the flavoring syrup into the neutral frozen carbonated beverage (FCB) base in the circumferential pattern provides a 360 degree exposure to the FCB base as it flows past the injection tubes 68 and 69. Using the two injection tubes arranged in the blending chamber so that one tube 69 is downstream from the other tube 68 and is offset from the other toward opposite sides of the centerline 79, is intended to cause the neutral FCB base to flow more to the right of one and more to the left of the other, to thereby aid in the distribution of the syrup into the beverage base. This forces the flavoring syrup further to the outer extremities of the flow path of the neutral beverage base.

The use of the graduated expansion chamber 35 allows the concentrated flavored FCB base to expand significantly, thereby creating a greater flow pattern of the desired flavor intensity and product consistency to enter the consumer's cup 19.

The dispensing event is terminated by pressing the stop button as in FIG. 10 for a model which does not have an automatic stop event. In another model, dispensing is terminated automatically by a pyro-sensor or other automatic means such as would use a keypad cover with legends as in FIG. 9. In either case, it is desirable that the termination of syrup flow of the selected flavor or flavors in the tubes in the pack 76 occur before the flow of the neutral base down the passageway 34M is terminated. For this purpose, the command module will respond to a signal from the sensor 20 or the start/stop, to keep the gas flowing through the ninth tube and delay the shifting of the draw valve to the closed condition.

Further referring to time delay and to gas or water injection mentioned above, there is a tee fitting 86 in a line supplied by CO2 tank. A branch line from that fitting goes to a two-way, electrically-operated, normally-closed valve 87 connected to tube 9. This is for preventing flavor over-run to be described in more detail below.

The flavor selector embodiment of the invention can use either the keypad cover shown in FIG. 10 if it requires a manual stop, or the one in FIG. 9 if it has an automatic stop. If the freezer is a model which has a draw handle, it can still have a flavor selection feature as mentioned above, but a start switch associated with the draw handle and a time delayed draw valve closed function related to the handle position or otherwise.

It has been mentioned above that either the keypad cover of FIG. 9 or that of FIG. 10 will be used with the flavor selector models of the FCB freezer that do not have a draw handle. The cover of FIG. 9 will be used with freezers having the automatic stop feature; the cover of FIG. 10 will be used with the manual stop version. Also, as noted above, if the freezer is not equipped with the flavor selector feature, then the selector portions of the covers will not be present.

Considering the expectation that owners of existing FCB freezers, and purchasers of new FCB freezers will want both the elimination of the draw handle, and the multi-flavor selection feature, the keypad of FIG. 4 is expected to be used on them. But many of the functions identified on the FIG. 4 keypad are not intended for use by the customer. And that is why the presentation to the customer will be as indicated for either the FIG. 9 or FIG. 10 array on the keypad cover. To tell the customer what each flavor number represents, there will be slots or other arrangements in the blank area of the keypad cover for inserting slides or attaching labels indicating the flavor associated with a number. Such indicators will be readily removable to accommodate a change of flavors as customer sentiments dictate. As suggested above, the customer can select a single flavor or can select several different flavors for one drink.

Referring further to FIG. 4, various functions are identified and which the customer does not see because they are covered up by the keypad covers of either FIG. 9 or FIG. 10.

The "water/syrup flush" key on the keypad and all of the other legends on the keypad except the numbered buttons and the start/stop, are normally covered by either the FIG. 9 or FIG. 10 keypad cover. They are for use by the owner, operator, or delegated attendant.

In the right-hand column, the various functions can be served by the attendant as and when some change appears to be needed in the performance of the system. The combo timer is used to establish the length of time that each of two choices would run to provide a half-and-half mixture of two selected flavors. Similar to the combo timer readout, there is a syrup flow readout with attendant control for that. There is the serving counter readout and an associated indicator light adjacent a reset button. There is a system overload button to provide a reset in the event some portion of the system has been overloaded in some way. The timer button indicates the length of time while the machine is dispensing a serving. The owner or operator would remove the keypad cover to make adjustments to the operations.

Each of the customer or maintenance function legends may have an associated light, for backlighting or otherwise to facilitate reading it or alerting the user to take some action, or to notice some fault as by a jewel light adjacent the overload button. More specifically, the instructions 1-4 on the keypad cover FIG. 9 or FIG. 10 are for customer use. Each key has a light emitting diode (LED) that lights when the customer makes a selection, and goes out after the beverage has been drawn. The electronics associated with these indicators and selectors is well within the scope of the art, so is not shown or described in any detail herein.

Operating Sequence of the Automatic Draw Valve Freezer

1. Customer places cup 19 in the Freezer Cup Holder.
2. The customer selects flavor(s) (1-8) accessible with the Control Keypad Cover in place.

3. Customer presses the 'start' button on the Control Keypad.
4. The Cable 67 is energized, opening Port B on the 4-Way Valve 17, releasing CO2 pressure to Port B on the CO2 Cylinder 44 forcing the cylinder to open, thus opening the Draw Valve 23 allowing Neutral FCB Base Product to flow into the Draw Valve Chamber 34M.
5. At the same time the functions in paragraph 4 are happening, the flavor pump in the syrup storage and delivery module 16 ("Flavor Burst Cabinet") begins pumping when the 'start' button is pressed, pumping Flavoring Syrup through one or more tubes (as customer has selected) of the 8-tube assembly 76 through the FCB Syrup Port 72 through the Double Injection Tubes 68 and 69 into the flow of the Neutral FCB Base Product.
6. As the Neutral FCB Base Product and the Flavoring Syrup flow through the Blending Chamber 34M, the two parts mix together creating a concentrated mixture at 80.
7. When the mixture 80 reaches the end of the Blending Chamber 34M, it enters the Graduating Expansion Chamber 36.
8. As the Concentrated Flavor Base mixture progresses through the Graduating Expansion Chamber 36, it continues to expand until the product exits the Graduating Expansion Chamber 37 into the serving cup 19.
9. When the Pyro-Sensor 20 in the cup holder detects that the cup is sufficiently filled with the Expanded Flavored Product called (FCB), the unit automatically shuts down, first stopping the syrup pump, thus stopping the flow of Flavoring Syrup to the Blending Chamber.
10. When the syrup pump stops, the two-way valve opens at the same time and remains open while CO2 is injected into tube 9 of the nine-tube assembly 76. While the CO2 flows through the tube 9, the residual flavoring is purged from the Injection Tubes 68 and 69 into the blending chamber where it is mixed with the neutral base product.
11. A time delay unit, preferably in or associated with the delivery module 16, provides a short period of about 0.3 seconds after the syrup pump has stopped, until the Cable 67 is de-energized, closing the 4-Way Valve 17, stopping the flow of CO2 to the Cylinder Port B and venting at port BV on valve 17. As this occurs, CO2 is supplied from Valve 17 to Port A of cylinder 44, closing the Draw Valve 23 and stopping the flow of Neutral FCB Base through the Draw Valve into the Blending Chamber 34M. The draw valve then closes and the two-way valve shuts down 0.3 seconds after the draw valve closes, purging all remaining product from the draw valve, to eliminate flavor carry-over into the next serving.

In summary, overall sequence would be as follows:

1. Product is being dispensed and syrup pump is injecting syrup.
2. The cup holder sensor 20 detects that the cup is nearly full and shuts down pump.
3. At the same time the pump stops, the two-way valve opens allowing CO2 to flow through tube 9 of the nine-tube syrup assembly, forcing the residual syrup out of the injector tubes into the blending chamber where it is mixed with the base product.
4. After 0.3 seconds, the four-way valve closes the draw valve, stopping the flow of neutral base product into the draw valve.
5. After 0.2 more seconds, the two-way valve closes, stopping the flow of CO2 through the injection tubes. The 0.2 seconds of pressure forces out of the spout, product remaining from the draw valve.

From the foregoing description, it can be recognized that a customer trying to use a draw handle to produce a properly-flavored frozen beverage, could have a problem obtaining the proper mix of syrup with carbonated water during dispensing of the drink while trying to provide a full cup without overflow. That can result in a drink that either has too much or too little syrup or irregular distribution, to have a good flavor. The modification of a dispenser head described first above and which eliminates the need for a draw handle, can be understood to be a significant advantage to the customer trying to obtain a good balanced drink flavored to his or her taste.

An example of an FCB freezer which can be modified as described herein is the Taylor Model C300 marketed by Taylor Co., a division of Carrier Commercial Refrigeration, Inc. of Rockton, Ill. An example of a pyro-sensor useful in the practice of the invention is Model 44CM12 by Eltec Instruments, Inc. of Daytona Beach, Fla.

Some time delay durations are mentioned above. These are only examples as, with experience, some differences may be found preferable depending, for example, on materials of construction, materials to be dispensed, size and shapes of serving cups.

For the freezer with the selectable flavor option, the base can be similar to those used in flavored base for soft drinks, and which is taken from bagged concentrate and diluted with water injected as in conventional freezers with flavored base, but is unflavored or has a slightly lemon-lime note. Typical ingredients are: high fructose corn syrup, water, sodium citrate, citric acid, granulated sugar, propylene glycol alginate, natural flavors, sodium benzoate as a preservative, ethyl alcohol, polysorbate 80, and BHA & BHT as antioxidants.

Regarding controls, a keypad and cover are described, but other types can be used. Touch screen is just one example. Therefore, while the foregoing specification shows and describes in some detail, devices and components for practicing the invention in the illustrated embodiment, possible variations from some details may be preferred at some later date, and which will be within the scope of the invention and are intended to be covered by the claims which follow.

The invention claimed is:

1. On a frozen carbonated beverage freezer which has a dispensing head with an inlet for entry of a soft-frozen beverage and an outlet for discharge of said beverage into a drinking receptacle, and a first cylinder with a draw valve piston movable longitudinally in said cylinder to start and stop passage of said beverage from said inlet through a passageway to said outlet, the improvement comprising:

a second cylinder attached to said first cylinder, and which has a piston rod; and at least a first member connecting the piston rod to the draw valve piston whereby longitudinal movement of said member resulting from longitudinal movement of the piston rod along a first axis is operable to move said draw valve piston longitudinally along a second axis to alternately start and stop passage of said beverage;

wherein said first and second axes are offset and parallel.

2. The improvement of claim 1 and further comprising a bracket connecting said first cylinder to said second cylinder.

3. The improvement of claim 1 and wherein said first member is a shroud covering said first and second cylinders.

4. The improvement of claim 3 and further comprising a pin connecting the shroud to the draw valve piston in said first cylinder.

5. The improvement of claim 1 and further comprising:

a flow rate adjuster connected to said draw valve piston and operable to limit the rate of passage of said beverage to said outlet.

6. On a frozen carbonated beverage freezer which has a dispensing head with an inlet for entry of a soft-frozen beverage and an outlet for discharge of said beverage into a drinking receptacle, and a first cylinder with a draw valve piston movable longitudinally in said cylinder to start and stop passage of said beverage from said inlet through a passageway to said outlet, the improvement comprising:

a second cylinder attached to said first cylinder, and which has a piston rod;

at least a first member connecting the piston rod to the draw valve piston whereby longitudinal movement of said member is operable to move said draw valve piston to alternately start and stop passage of said beverage;

a second piston in said second cylinder; and ports on said second cylinder to opposite ends of said second piston for selectively admitting into said second cylinder on opposite ends of said second piston, pressurized fluid, to selectively start and stop passage of said beverage from said inlet to said outlet.

7. The improvement of claim 6 and wherein:

said freezer has a supply of carbon dioxide; and fluid conduits are coupled to said ports and to said supply.

8. The improvement of claim 7 and further comprising:

a fluid control valve which has an inlet port coupled through one of said conduits to said supply; and wherein:

said control valve has two outlet ports, and one of said outlet ports is coupled through one of said conduits to one of said ports on said second cylinder, and the other of said outlet ports is coupled through another of said conduits to the other of said ports on said second cylinder;

said control valve can be shifted from one condition applying pressurized carbon dioxide to one of said ports in said second cylinder, to another condition applying pressurized carbon dioxide to the other of said ports in said second cylinder whereby said control valve is operable to selectively cause said member to move said flow valve in one direction or an opposite direction.

9. The improvement of claim 8 and further comprising:

a solenoid coupled to said fluid control valve; and a user operable switch on said freezer and coupled to said solenoid and operable responsive to actuation by a user to cause said second cylinder to move said draw valve piston to permit passage of said beverage; and a responder coupled to said fluid control valve to cause said second cylinder to return said draw valve piston to stop said passage of said beverage.

10. The improvement of claim 9 and wherein:

said responder is responsive to the receptacle state of fill to return said draw valve piston to stop said passage.

11. The improvement of claim 9 and wherein:

said responder is responsive to a sensor signal to stop said passage.

12. On a frozen carbonated beverage freezer which has a dispensing head with an inlet for entry of a soft-frozen beverage, and an outlet for discharge of said beverage into a drinking receptacle, and a first passageway for said beverage from said inlet to said outlet, and a first cylinder with a draw valve piston movable longitudinally in said cylinder to start and stop passage of said beverage from said inlet to said outlet, the improvement comprising:

an apparatus coupled to said head for admission of at least one flavoring liquid into said passageway for blending into a beverage base flowing from said inlet toward said outlet when said draw valve piston is in position to start flow of said beverage base from said inlet toward said outlet;

wherein said apparatus includes two tubes extending into said passageway to deliver the at least one flavoring liquid into said passageway, wherein each of said tubes defines an open end in communication with said passageway and at least one slot in communication with said passageway.

13. The improvement of claim 12 and wherein said tubes are vertically.

14. The improvement of claim 12 and wherein said tubes are spaced from each other longitudinally in said passageway and offset toward opposite sides of a longitudinal axis of said passageway.

15. The improvement of claim 12 and further comprising:

a flavoring liquid storage and delivery device coupled to said apparatus to deliver to said apparatus, upon request, flavored liquid of flavor specified in the said request.

16. On a frozen carbonated beverage freezer which has a dispensing head with an inlet for entry of a soft-frozen beverage, and an outlet for discharge of said beverage into a drinking receptacle, and a first passageway for said beverage from said inlet to said outlet, and a first cylinder with a draw valve piston movable longitudinally in said cylinder to start and stop passage of said beverage from said inlet to said outlet, the improvement comprising:

modification of said head, and an apparatus coupled to said head for admission of a flavoring liquid into said passageway for blending into a beverage base flowing from said inlet toward said outlet when said draw valve piston is in position to start flow of said beverage base from said inlet toward said outlet;

wherein said apparatus further comprises:

a source of pressurized CO2;

a first valve coupled to said source and operable to cause said draw valve to open and close;

a second valve coupled to said source to said second passageway and operable to cause said CO2 to purge said flavored liquid from said second passageway.

17. On a frozen carbonated beverage freezer which has a dispensing head with an inlet for entry of a soft-frozen beverage, and an outlet for discharge of said beverage into a drinking receptacle, and a first passageway for said beverage from said inlet to said outlet, and a first cylinder with a draw valve piston movable longitudinally in said cylinder to start and stop passage of said beverage from said inlet to said outlet, the improvement comprising:

modification of said head, and an apparatus coupled to said head for admission of a flavoring liquid into said passageway for blending into a beverage base flowing from said inlet toward said outlet when said draw valve piston is in position to start flow of said beverage base from said inlet toward said outlet;

wherein said head further comprises:

a first port in the exterior of said head; and a second passageway in said head and communicating with said first port and said first passageway;

wherein said apparatus further comprises:

a tube in said second passageway from said first port into said first passageway for injection of said flavoring liquid into said beverage base, wherein said tube has outlets in said first passageway for blending said flavoring liquid into said beverage base across the cross sectional area of said first passageway;

a third passageway in said head and communicating with said first port and said first passageway;

a second tube in said third passageway and which has outlets in said first passageway, and wherein:

said outlets are spaced from each other longitudinally in said first passageway and offset toward opposite sides of a longitudinal axis of said first passageway; and said outlets comprise slots in sides of said tubes.

18. The improvement of claim 17 and wherein:

said tubes are open ended in said first passageway, and said slots extend from the open ends of said tubes toward a surface defining the inside wall of said first passageway.

19. The improvement of claim 12 and wherein said slots extend from the open ends of said tubes toward a surface defining the inside wall of said passageway.

* * * * *

UNITED STATES PATENT AND TRADEMARK OFFICE

CERTIFICATE OF CORRECTION

PATENT NO. : 8,403,179 B1
APPLICATION NO. : 12/102093
DATED : March 26, 2013
INVENTOR(S) : Ernest C. Gerber It is certified that error appears in the above-identified patent and that said Letters Patent is hereby corrected as shown below:

In the Claims

In column 12, line 5, claim 13, insert the word --arranged-- after the word “vertically”.

Signed and Sealed this
Second Day of July, 2013

Teresa Stanek Rea
*Acting Director of the United States Patent and Trademark Office*